3,651,199
Patented Mar. 21, 1972

3,651,199
PROCESS FOR PRODUCING PHENOL-ALDEHYDE RESIN FIBERS
Roe C. Blume, Wilmington, Del., and Ludwig E. Seufert, Boothwyn, Pa., assignors to E. I. du Pont de Nemours and Company, Wilmington, Del.
No Drawing. Filed Apr. 3, 1969, Ser. No. 813,289
Int. Cl. B29c 25/00
U.S. Cl. 264—236
10 Claims

ABSTRACT OF THE DISCLOSURE

Phenol-aldehyde resin fibers are produced by extruding molten cross-linkable resin, solidifying the fiber, and treating the solidified fiber with a Friedel-Crafts catalyst (preferably boron trifluoride etherate or methanesulfonic acid) to cross-link the surface of the fiber. The resultant self-supporting fiber with a core of cross-linkable resin encased by a sheath of cross-linked resin is then heated to cross-link substantially all of the remaining cross-linkable resin.

SPECIFICATION

This invention relates to a novel cross-linked phenol-aldehyde resin product and a novel process for the preparation thereof.

BACKGROUND OF THE INVENTION

The well-known reactions of phenol and aldehyde in forming a cross-linked resin are customarily divided into three stages: A, B, and C. The A stage resin is a soluble, fusible, cross-linkable product, which upon continued heating is converted into a softenable but non-melting material (B stage resin) and finally into a tough cross-linked intractable product (C stage resin).

It is well known that shaped objects of the C stage resin may be prepared by confining molding powders containing the A or B stage precursor in a mold and subjecting them to heat and pressure. During the conversion to the C stage, it was necessary to support the resin in a mold because the temperature required to achieve a substantial rate of conversion usually exceeded the melting point of the A stage resin. For this reason, it was not feasible to convert an unsupported article, such as a continuous filament because it would be quite difficult, if not impossible, to retain the desired filamentary form during the process. This inability to retain an unsupported filament during the conversion to the C stage, together with the insolubility and infusibility of the B and C stage products appeared to preclude the use of known extrusion techniques for preparing continuous filaments of cross-linked phenol-aldehyde resin.

The present invention overcomes the above difficulties and provides a novel, economic process for preparing fibers (i.e., continuous filaments or staple fibers) comprised substantially entirely of cross-linked phenol-aldehyde resins. The present invention also provides fibers of a cross-linked phenol-aldehyde resin that exhibit high levels of resistance to heat, solvents and electric currents, together with useful properties not inherent in other forms of the resin.

SUMMARY OF THE INVENTION

The present invention provides cross-linked phenol-aldehyde resins, fibers, and a process for preparing these fibers.

The process comprises:

(1) extruding molten cross-linkable phenol-aldehyde resin through at least one spinneret orifice, and preferably attenuating the as-extruded fiber,
(2) solidifying the resultant fiber, and
(3) treating the solidified fiber with a suitable Friedel-Crafts catalyst (preferably boron trifluoride etherate or methanesulfonic acid dissolved in an inert solvent, e.g., methylene chloride) for a period of time sufficient to catalytically cross-link substantially the entire surface of the fiber.

The resultant novel fiber is characterized by two types of phenol-aldehyde reaction products: (1) a core of cross-linkable resin which is encased by (2) a sheath of cross-linked resin. A substantially cross-linked fiber can be easily prepared from these "sheath-core" fibers by heating the fiber to a temperature between about 75° C. and 300° C. (preferably about 110° C.) for a period of time sufficient to cross-link substantially all of the remaining cross-linkable resin. During this heating the fiber remains self-supporting due to the cross-linked sheath; an external support (e.g., a mold) is not necessary. The novel continuous filaments of cross-linked phenol-aldehyde resin provided by this invention were not heretofore feasible and are highly useful as continuous filaments or when severed into staple length fibers.

Prepolymer preparation

Cross-linkable composition suitable for preparing the filaments of this invention comprise well-known phenol-aldehyde condensation products. These products (which may be referred to as the A stage resin previously mentioned) melt between about 40 and 70° C. and are cross-linkable (i.e., capable of undergoing additional cross-linking to form intractable resins without any additional reactants).

One method of producing such a cross-linkable resin is to charge all of the necessary reactants (phenol, aldehyde and basic catalyst) into a resin kettle. The resin produced is known as a "resole resin" (or "resole"). Control of the exothermic reaction (e.g., time, temperature) is necessary to produce the desired A stage resin. Suitable basic catalysts include alkali hydroxide, alkaline earth hydroxide, ammonia, amino or quaternary ammonium compounds; preferred basic catalysts include barium hydroxide, and sodium hydroxide. A ratio of 1.5 moles of aldehyde per mole of phenol is suitable.

Another method of producing suitable cross-linkable resins is to first produce a "novolak" (or "novolac") resin by reacting a high ratio of phenol to aldehyde, e.g., (1:0.8) preferably using an acid catalyst. Although these linear, soluble, fusible polymers do not themselves react further to give cross-linked resins (i.e., they are not cross-linkable), they can be made cross-linkable ("A" stage resin), e.g., by being further reacted with more aldehyde in the presence of an alkaline catalyst. Methods for preparing resole and novolak resins are well known in the art and are exemplified hereinafter.

It is not essential to the practice of this invention that all of the resin be cross-linkable. For example, a "resole" resin combined with an equal weight of a "novolak" resin is suitable herein, as is seen in the following examples.

Although the most important phenol-aldehyde resins are made from phenol and formaldehyde, phenol derivatives such as resorcinol or para-tertiarybutyl phenol, cresols, etc., and other lower aldehydes may similarly be employed. together with the principle reactants. Similarly, the resin may contain "fillers" (to improve various properties of the finished article) as long as the filler does not render the resin non-extrudable. Pigments or dyes, flame-retardants, etc., are conventional "fillers" which may be suitably added.

Extrusion

Fibers are obtained by extruding a melt comprising a suitable cross-linkable resin through one or more spinnert orifices by conventional melt spinning techniques. Suitable resins are solid and non-tacky at room temperature and melt between about 40 and 70° C. The temperature of the melt should not exceed 70° C. to avoid premature cross-linking of the resin, since the resultant intractable gel could disrupt a continuous spinning operation and would be difficult to remove from the spinning apparatus.

The extruded fibers are generally continuous filaments, although they may be severed (e.g., cut or broken) into staple lengths if necessary or desirable, prior or subsequent to catalytically treating the fiber, as described hereinafter. For example, when the filaments are passed through an air jet as hereinafter discussed and exemplified, staple fibers are generally produced. Similarly, if the catalytically treated fiber is a continuous fiber, it may be severed in staple fiber (either before or after it is heated to substantially cross-link it).

The molten extrudate preferably is attenuated using conventional melt spinning techniques. The attenuation is readily accomplished using an air jet or by passing a solidified section of the filament over a draw roll.

Since the resin is solid at room temperature, the molten extrudate is easily solidified, e.g., by passing the extrudate into a zone at room temperature.

Cross-linking of the filament surface (sheath)

The solidified fiber of cross-linkable resin is treated with a Friedel-Crafts catalyst, preferably boron trifluoride etherate or methanesulfonic acid. These catalysts are preferred because they promote a rapid reaction and are not inactivated by phenols, aldehydes or water, the latter being a by-product of the cross-linking reaction. Some Friedel-Crafts catalysts, e.g., anhydrous aluminum chloride, are so reactive with water as to make them less satisfactory for use in the present process, since a large excess of the salt would be required. Ferric chloride is known to form catalytically inactive complex products with phenols, and is also less suitable. The catalyst is preferably in solution with an inert non-basic medium (i.e., a medium which will neither dissolve the filament nor exhibit sufficient basicity to react with and/or inactivate the catalyst). Preferably the concentration of catalyst in the solution is between 0.1 and 10% by weight. A preferred inert non-basic medium for boron trifluoride etherate is methylene chloride. The temperature of the catalyst solution is maintained below the melting point of the fiber. The fiber is immersed in the catalyst solution until the resin on the surface of the filament has cross-linked to form a network structure, which is often indicated by the appearance of a reddish color in the fiber. The time required to achieve the desired degree of cross-linking is easily determined by routine experimentation and is believed to be a function of catalyst concentration and solution temperature. The surface of the fiber should be sufficiently cross-linked to form a sheath or "skin" around the cross-linkable core which serves to retain fiber integrity during the subsequent heat treatment. For example, using a catalyst concentration of 5% by weight and maintaining the solution at ambient temperature, residence times of up to 10 minutes are preferred. The resin fiber may be extruded through an air gap to solidify the filaments and then passed directly into the catalyst solution or the solidified fibers may be collected as a batt, which is subsequently treated with catalyst.

Although it is preferred that the catalyst be in solution, alternatively the catalyst may be in the gaseous stage (see Example I). The gaseous catalyst concentration is preferally equivalent to the partial pressure of boron trifluoride vapor in equilibrium with the liquid at ambient temperature.

Cross-linking of the interior fiber structure (core)

Once the initial stage of cross-linking is completed, the fiber is heat treated to transform the cross-linkable resin within the body of the fiber to a cross-linked final product. If a mechanical crimping operation is desired, this is preferably performed following the initial cross-linking and prior to heat treatment.

The heat treatment of the fiber is accomplished by gradually raising the environmental temperature preferably to between about 70 and 300° C. It is believed that 70° C. is the lowest temperature at which cross-linking of the polymer will occur at an appreciable rate.

The rate of heating is a function of the fiber diameter and the degree to which the surface of the fiber has been cross-linked by the catalyst in the preceding step of the process. Too rapid a rate may cause the "skin" to burst, resulting in exhuding of polymer and porous fibers. For most fibers a heating rate of about 1.5° C. per minute has been found satisfactory.

The chemical (catalytic) and thermal cross-linking steps may be carried out separately or they may be combined into a single operation suitable for the production of continuous filaments. In the latter process, a molten fiber of cross-linkable stage resin is extruded into air. The solidified fiber is then passed into the catalyst solution, and while still wetted with the solution, is passed for 1 to 3 turns around a roll heated to a temperature of between 80 and 300° C. The resultant substantially cross-linked product may then be wound on conventional textile bobbins.

Utility

The cross-linked phenol-aldehyde continuous filaments or staple fibers of this invention exhibit properties characteristic of thermosetting resins, i.e., they are infusible, intractable and insoluble. The filaments and fibers are suitable for incorporation into woven and non-woven fabrics and filling material that exhibit a high level of heat- and flame-resistance. Surprisingly it has been found that while batts comprising the present filaments and fibers will carbonize when placed directly in a flame, the form and resilience of the batt is to a large extent retained. This is in contrast to other "flameproof" polymers, which form a brittle char when exposed to a flame.

The resistance to heat, chemicals and electric current exhibited by phenol-aldehyde filaments and fibers make them eminently suitable for a wide variety of end-uses as insulation and reinforcing agents, many of which are not possible using non-continuous filamentary or non-filamentary forms of the resin.

EXAMPLES

The following non-limiting examples illustrate the preparation of the present fibers and some of the uses which are unique to this form of phenol-aldehyde resins. Parts and percentages are by weight unless otherwise indicated.

Example I

This example illustrates the preparation of a cross-linkable resin fiber.

A cross-linkable (or A stage resole) resin is prepared as described in "Preparative Methods of Polymer Chemistry" by Sorenson and Campbell. A mixture comprising 94 grams (1 mole) of phenol, 123 grams (1.5 moles) of a 37% by weight aqueous solution of formaldehyde and 4.7 grams of solid barium hydroxide octahydrate is prepared using a 500 cc.-capacity resin kettle equipped with a reflux condenser, stirrer and thermometer. The mixture is stirred and heated for two hours using a bath temperature of 70° C. A 50 gram portion of the resultant polymer solution is concentrated under reduced pressure using an 80° C. bath to obtain a weight loss of 32 grams.

The resultant cross-linkable resin is placed in a press spinning cell exhibiting a cap temperature of 80° C. and extruded through a 0.003 inch (0.008 centimeter)-diameter spinneret orifice into air at ambient temperature to solidify the fiber.

The solidified fibers (continuous filaments) are mechanically traversed into a bobbin, which is subsequently placed in a vacuum desiccator above a container of boron trifluoride etherate for a period of about 16 hours to be catalytically treated by the gas. The temperature inside the vacuum desiccator is ambient and the concentration of the gaseous catalyst is equivalent to the partial pressure of boron trifluoride vapor over the liquid (approximately $1.55 \times 10^{-4}$ moles/liter). The final cross-linked resin is produced by transferring the bobbin to a vacuum oven and heated at 100° C. under reduced pressure for about 16 hours.

The resultant 2.79 denier fibers exhibit the following properties: Tenacity, 1.48 grams per denier; elongation, 2.9%; initial modulus, 64.3 grams per denier.

Example II

This example illustrates the preparation of a fiber from a mixture of resole and novolak resins.

A 500 cc.-capacity resin kettle equipped as described in Example I is charged with 130 grams (1.38 mole) of phenol, 13 cc. of water, 92.4 grams of an aqueous solution containing 34.1 g. (1.14 mole) of formaldehyde and 1 gram of oxalic acid dihydrate. The resultant mixture is stirred at reflux temperature for 30 minutes after which an additional 1 gram of oxalic acid dihydrate is added and the refluxing and stirring continued for an additional hour. After this time, 400 cc. of water is added, the reaction mixture is cooled and the upper layer syphoned off. The lower layer is concentrated under reduced pressure at 120° C. in a rotary evaporator until substantially all of the volatile material has been removed.

A mixture comprising 5 grams of the resultant novolak resin and 5 grams of the cross-linkable resole resin prepared as described in Example I is dissolved in 125 cc. of methanol. The resultant solution is concentrated under reduced pressure using an oil bath maintained at a temperature of 70° C. The evaporation is allowed to proceed until substantially all of the solvent has been removed.

The resultant prepolymer is then charged into a press spinning cell wherein the temperature of the cap is 40° C. An air jet (to attenuate the as-extruded continuous filament) is located about 5 inches (13 cm.) below the spinneret orifice, which exhibits a diameter of 0.005 inch (0.018 cm.). The resultant staple fibers are passed through the air jet into a flask containing a 5% by weight solution of boron trifluoride etherate in methylene chloride at ambient temperature. Ten minutes following completion of the extrusion, the resultant fibrous mat is removed from the flask.

The conversion to the final cross-linked resin is performed under reduced pressure and a temperature of about 120° C. for about 16 hours.

The resultant 40.6 denier fibers exhibit the following properties: Tenacity, 1.09 grams per denier; elongation, 62.9%; initial modulus, 20.3 grams per denier.

Example III

This example further illustrates the preparation of fibers from a mixture of resole and novolak resins.

The resole/novolak mixture described in Example II is extruded using a press spinning unit equipped with a circulating water bath maintained at a temperature of 75° C. The emerging filament is passed successively through a 6-inch (15 cm.) long air gap, over a polytetrafluoroethylene guide and finally at about 6 yards/min. into a 5% by weight solution of boron trifluoride etherate in methylene chloride at ambient temperature. The bath exhibits a length of 28 inches (70 cm.).

Upon emerging from the bath, the continuous filaments are wrapped for one and a half turns over a 4-inch (10 cm.) diameter driven bobbin which is heated to a temperature of about 100° C. for sufficient time to produce the final cross-linked resin.

Example IV

This example illustrates the use of resole/novolak resins in fibers of the invention which are incorporated into honeycomb-shaped structural reinforcing agents.

An extrudable resin mixture is prepared as described in Example II. Fibers are extruded using a press spinning cell with a cap temperature of 50° C. and a spinneret orifice diameter of 0.011 inch (0.028 cm.). The fibers are passed through an air jet and collected as a mat using a wire screen as a base.

The mat and wire screen are placed in a 5% by weight solution of boron trifluoride etherate in methylene chloride at ambient temperature for ten mintes after which they are removed and soaked in a methylene chloride bath for about 15 minutes to remove excess catalyst.

The fibrous mat is then placed on a corrugated surface exhibiting a peak-to-peak distance of 0.4 inch (1.0 cm.) and the mat is forced into the corrugations, after which it is heat treated to cross-link the resin as described in Example I.

A laminate is prepared by alternating the corrugated webs with flat ones which are prepared using the foregoing procedure, with the exception that they are heat set on a flat surface. The resultant honeycomb-shaped configuration is dipped in a 30% by weight methanol solution of the resole/novolak resin described in Example II and the resultant structure heat treated as described in Example I. The dipping and heat treating procedure is repeated three times.

Square sections measuring 0.25 inch (0.63 cm.) along each side were cut from the resulting structure and tested in compression, the force being applied in a direction parallel with respect to the cell walls. A sample wherein the density of the structure is 23 pounds per cubic foot (0.37 gram per cubic centimeter) withstood a force of 2280 pounds per square inch (160,000 grams per square centimeter).

Example V

This example illustrates the use of methane-sulfonic acid as a catalyst.

An extrudable resin mixture is prepared as described in Example II and extruded using a press spinning cell with a cap temperature of 40° C. and a spinneret orifice diameter of 0.011 inch (0.028 cm.). The solidified fiber is passed into a 1% by weight solution of methanesulfonic acid in methylene chloride that is maintained at ambient temperature. After remaining in the bath for 10 minutes, the fiber is removed, washed with methylene chloride to remove excess catalyst and then heat treated in an oven at 120° C. for 16 hours.

The resultant fiber exhibits a tenacity, elongation and initial modulus of 0.63 gram per denier, 6.9% and 12.7 grams per denier, respectively.

What is claimed is:

1. A process for preparing phenol-aldehyde resin fibers comprising:
   (1) extruding a composition consisting essentially of molten phenol-aldehyde resin comprising cross-linkable phenol-aldehyde resin through at least one spinneret orifice,
   (2) solidifying the resultant fiber, and
   (3) treating the solidified fiber with a suitable Friedel-Crafts catalyst for a period of time sufficient to catalytically cross-link substantially the entire surface of the filament, to prepare a fiber having a sheath of cross-linked phenol-aldehyde resin and a core of cross-linkage phenol-aldehyde resin.

2. Process of claim 1 further comprising: heating the treated fiber to a temperature between about 75° C. and 300° C. for a period of time sufficient to cross-link substantially all of the remaining cross-linkable resin.

3. Process of claim 1 further comprising: attenuating the as-extruded fiber.

4. Process of claim 2 wherein said Friedel-Crafts catalyst is boron trifluoride etherate and said treating comprising passing the solidified filament through a solution of the catalyst in methylene chloride.

5. Process of claim 4 wherein the concentration of the catalyst in the solution is between about 0.1 and 10% by weight.

6. Process of claim 2 wherein said Friedel-Crafts catalyst is methanesulfonic acid in methylene chloride at a concentration of between about 0.1 and 10% by weight.

7. Process of claim 2 wherein said heating is to a temperature of about 110° C.

8. Process of claim 2 wherein said resultant fiber is continuous filament further comprising severing said continuous filament into staple fiber.

9. Process of claim 8 wherein said severing is prior to said treating step (3).

10. Process of claim 8 wherein said severing is subsequent to said treating step (3).

References Cited

UNITED STATES PATENTS

| | | | |
|---|---|---|---|
| 1,930,229 | 10/1933 | Dreyfus et al. | 161—177 |
| 2,142,007 | 12/1938 | Schlack | 264—184 |
| 2,376,511 | 5/1948 | Saunders | 264—210 Z |
| 2,658,885 | 11/1953 | D'Alelio | 260—59 |
| 2,683,130 | 7/1954 | D'Alelio | 260—59 |
| 2,785,975 | 3/1957 | Sheeran | 260—59 |
| 3,242,244 | 3/1966 | Maly | 264—176 Z |
| 3,351,610 | 11/1967 | Preininger et al. | 260—59 |
| 3,408,435 | 10/1968 | Logan | 264—176 Z |
| 3,453,357 | 7/1969 | Logan | 264—176 Z |
| 2,484,523 | 10/1949 | McClellan | 264—178 Z |

JAY H. WOO, Primary Examiner

U.S. Cl. X.R.

260—57, 59; 264—176 F, 210 F, 347